United States Patent
Horiuchi et al.

(10) Patent No.: US 6,728,407 B1
(45) Date of Patent: Apr. 27, 2004

(54) METHOD FOR AUTOMATICALLY DETERMINING TRACKERS ALONG CONTOUR AND STORAGE MEDIUM STORING PROGRAM FOR IMPLEMENTING THE SAME

(75) Inventors: Yoshio Horiuchi, Hiratsuka (JP); Masayuki Ryuhtoh, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,918

(22) Filed: May 16, 2000

(30) Foreign Application Priority Data

May 17, 1999 (JP) .......................................... 11-135900

(51) Int. Cl.[7] ............................. G06K 9/48; G06K 9/00
(52) U.S. Cl. ......................... 382/199; 382/131; 382/132
(58) Field of Search ................................ 382/199, 195, 382/190, 181, 132, 131, 128, 197, 242, 266; 600/437, 443

(56) References Cited

U.S. PATENT DOCUMENTS

| | | | | | |
|---|---|---|---|---|---|
| 4,910,786 A | * | 3/1990 | Eichel | ........................ | 382/199 |
| 4,967,079 A | * | 10/1990 | Shimura | ..................... | 250/586 |
| 5,469,850 A | * | 11/1995 | Iizuka et al. | ................ | 600/443 |
| 5,668,889 A | * | 9/1997 | Hara | .......................... | 382/132 |
| 5,764,791 A | * | 6/1998 | Hara | .......................... | 382/132 |
| 5,764,807 A | * | 6/1998 | Pearlman et al. | ........... | 382/240 |
| 5,817,019 A | * | 10/1998 | Kawashima | ................ | 600/437 |
| 6,195,445 B1 | * | 2/2001 | Dubuisson-Jolly et al. | . | 382/107 |
| 6,226,417 B1 | * | 5/2001 | Yamagata et al. | .......... | 382/289 |

FOREIGN PATENT DOCUMENTS

| | | | | |
|---|---|---|---|---|
| GB | 2 121 534 A | 12/1983 | ........... | G01B/11/03 |
| GB | 2 344 419 A | 6/2000 | ............. | G06T/7/60 |
| JP | 04182882 A | * 6/1992 | ........... | G06F/15/72 |
| JP | 06-282652 | 10/1994 | ........... | G06F/15/70 |

OTHER PUBLICATIONS

"Dynamic Programming for Detecting, Tracking, and Matching Deformable Contours," Geiger, D, et al. IEEE Transactions on Pattern Analysis and Machine Intelligence, vol. 17, No. 3, Mar. 1995, pp. 294–302.*

* cited by examiner

*Primary Examiner*—Wenpeng Chen
(74) *Attorney, Agent, or Firm*—Scully, Scott, Murphy & Presser; Daniel P. Morris

(57) ABSTRACT

The present invention provides a method for automatically determining trackers along a contour of a particular object in a displayed image and a storage medium storing a program for implementing the method. This method comprises the steps of: establishing an initial region containing the particular object therein and setting a plurality of initial points on a boundary of the initial region; setting a target point for scanning the image from each of the plurality of initial points toward an inside of the initial region; selecting one or more tracker candidate points along a line segment between each of the plurality of initial points and the target point, in accordance with magnitude of the contour; and determining a set of tracker candidate points which minimizes a cost, by using dynamic programming, starting from a selected initial point among the plurality of initial points.

12 Claims, 9 Drawing Sheets

METHOD FOR AUTOMATICALLY DETERMINING TRACKERS ALONG CONTOUR AND STORAGE MEDIUM STORING PROGRAM FOR IMPLEMENTING THE SAME

BACKGROUND OF THE INVENTION

1. Technical Field

The present invention relates to image processing and more particularly to a technique for automatically determining control points or trackers along a contour of a desired region or object in an image displayed on a display screen in order to extract the desired region or object.

2. Prior Art

Some known image processing software programs for composing and editing images are provided with an optional tool for detecting the contour of a particular region or object on an image in order to select the particular region or object. Heretofore, this contour detection has been generally performed by tracing the contour by using a pointing device such as a mouse. The contour trace using the pointing device is disclosed in the following publications.

For example, a method for extracting a region is disclosed in Japanese Patent Publication No. 5-233810. The method comprises the steps of roughly tracing a contour line of a region to be extracted in a displayed original image by using a pointing device to thereby specify a rough contour line containing the contour line; calculating an edge magnitude for each pixel of the original image in the rough contour line; setting, as an object to be deleted, each pixel having the edge magnitude equal to or less than a predetermined threshold value; applying center line extraction processing until there remains no pixel that can be deleted; and while increasing the threshold value, repeatedly applying the center line extraction processing to the rough contour line until a thin line having a line thickness of one pixel is obtained as a result of thinning, which is used as the contour line.

An apparatus for extracting the image is disclosed in Japanese Patent Publication No. 6-325176. The apparatus is provided with contour specifying means comprising a pointing device for inputting line segments crossing a contour line of a source image on an image display; intersection detection means for detecting intersections of the line segments inputted by the pointing device and the contour line of the source image; an intersection information memory for storing information about the intersections detected by the intersection detection means; and polygonal contour line forming means for forming a polygonal contour line connecting the intersections corresponding to the intersection information in the intersection information memory.

Another method for extracting a region is disclosed in Japanese Patent Publication No. 8-77336. The method comprises the steps of displaying, on display means, an original image stored in storage means; specifying and inputting a belt-like outer-edge region by pointing means so as to contain a contour section being displayed; calculating a difference between each pixel of the original image in the outer-edge region and each of adjacent pixels in a color space; and determining that a partial image having a contour line connecting the pixels having a maximum difference is the region to be extracted in the original image.

It is difficult for an unskilled user to trace a contour on a screen by using a pointing device such as a mouse. The user has to either retry several times or slowly trace the contour in order to correctly trace the contour.

It is therefore an object of the present invention to provide a method capable of easily detecting a contour of a region or object to be extracted in an image without the need to trace the contour.

It is another object of the present invention to provide a computer readable storage medium which stores a program for implementing the method.

SUMMARY OF THE INVENTION

According to a first aspect of the present invention, there is provided a method for automatically determining trackers along a contour of a particular object in a displayed image, comprising the steps of:

establishing an initial region containing the particular object therein and setting a plurality of initial points on a boundary of the initial region;

setting a target point for scanning the image from each of the plurality of initial points toward the inside of the initial region;

selecting one or more tracker candidate points along a line segment between each of the plurality of initial points and the target point, based on the magnitude of the contour; and determining a set of tracker candidate points which minimizes a cost, by using dynamic programming, starting from a selected initial point among the plurality of initial points.

According to a second aspect of the present invention, there is provided a computer readable storage medium storing a program for implementing a method for automatically determining trackers along a contour of a particular object in a displayed image, said program comprising:

program code means for establishing an initial region containing the particular object therein and setting a plurality of initial points on a boundary of the initial region;

program code means for setting a target point for scanning the image from each of the plurality of initial points toward the inside of the initial region;

program code means for selecting one or more tracker candidate points along a line segment between each of the plurality of initial points and the target point, based on the magnitude of the contour; and program code means for determining a set of tracker candidate points which minimizes a cost, by using dynamic programming, starting from a selected initial point among the plurality of initial points.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
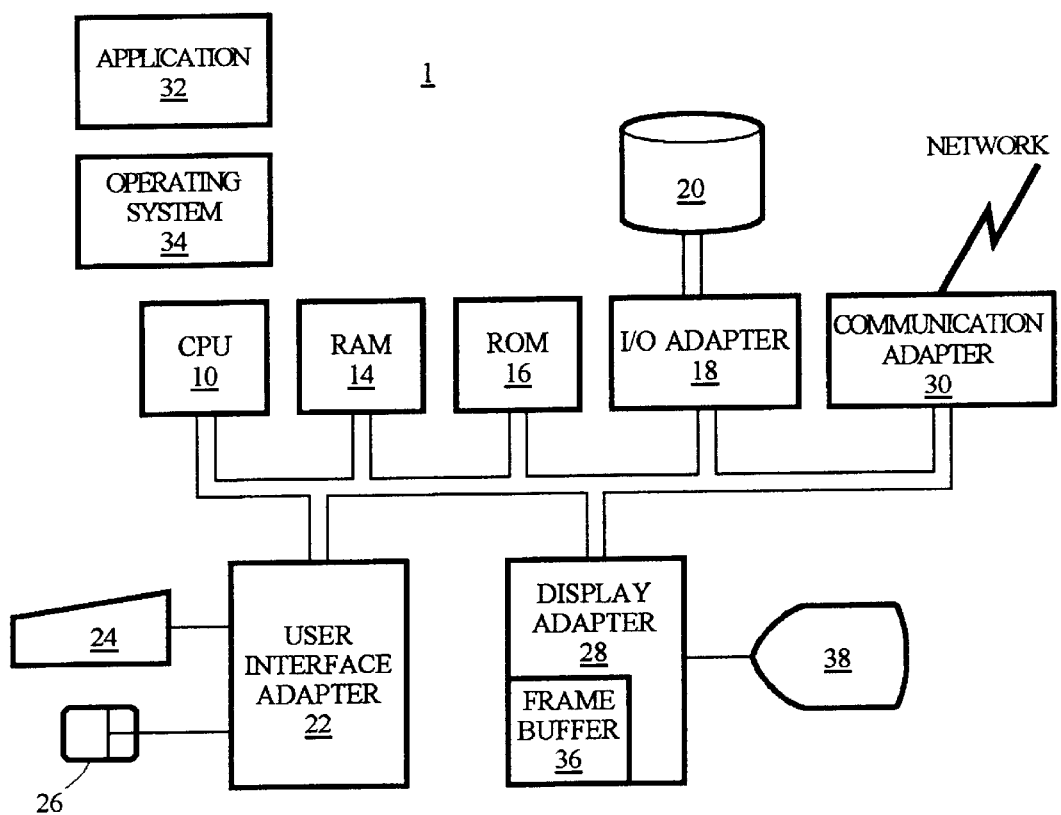
FIG. 1 illustrates a block diagram showing one example of an image processing system in which the present invention can be implemented.

FIG. 1 shows one example of an image processing system capable of implementing the present invention. This system may be a general-purpose computer system such as a personal computer or an engineering workstation which can execute appropriate image processing software including a method of the present invention. In FIG. 1, a system 1 comprises a central processing unit (CPU) 10 such as PowerPC (PowerPC is a trademark of IBM Corporation) or Pentium (Pentium is a trademark of Intel Corporation), and various components interconnected to the CPU 10 through a system bus 12. As one of the components, a read-only memory (ROM) 16 is connected to the CPU 10 through the system bus 12. This includes a basic input/output system (BIOS) for controlling basic computer functions. In addition, a random access memory (RAM) 14 functioning as a main memory, an I/O adapter 18, a user interface adapter 22, a display adapter 28 and an optional communication adapter 30 are connected to the system bus 12.

Each of the above-described components is a hardware component. The system 1 also includes software components such as an application program 32 and an operating system 34 which are executed by the CPU 10. These software components (also including the program for implementing the present method) are normally stored in a disk storage unit 20 such as a hard disk drive connected to the I/O adapter 18. The software components are loaded from the disk storage unit 20 to the RAM 14, and then executed. Image data to be processed in accordance with the present invention is stored in the disk storage unit 20 or any other storage medium not shown (CD-ROM, etc.). The image data is read out therefrom to the RAM 14, and then processed by the CPU 10. The I/O adapter 18 may be a small computer system interface (SCSI) adapter. The optional communication adapter 30 connects the system 1 to an external network. For example, the communication adapter 30 can be used to receive an image to be processed from a remote location.

Additionally, various input/output devices are connected to the system bus 12 through the user interface adapter 22 and the display adapter 28. A keyboard 24 and a mouse 26 are connected to the system bus 12 through the user interface adapter 22. The display adapter 28 includes a frame buffer 36 which is a storage unit for holding pixel information of the image displayed on a screen of a display device 38. The pixel information, which is read from the frame buffer 36, is transferred to the display device 38 through a digital-to-analog converter (not shown) and displayed on the screen of the display device 38. A user can enter information into the system 1 through the keyboard 24 or the mouse 26 and output information from the system 1 through the display device 38.

Figure 2:
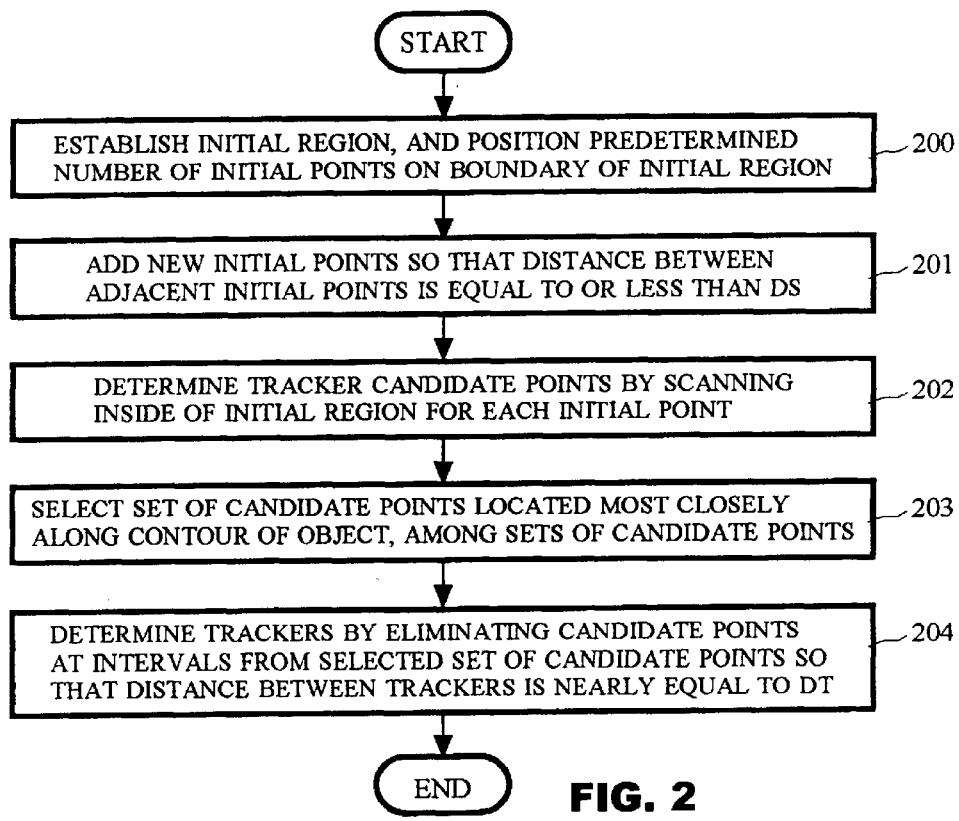
FIG. 2 illustrates a flowchart schematically showing a method of the present invention.
Figure 3:
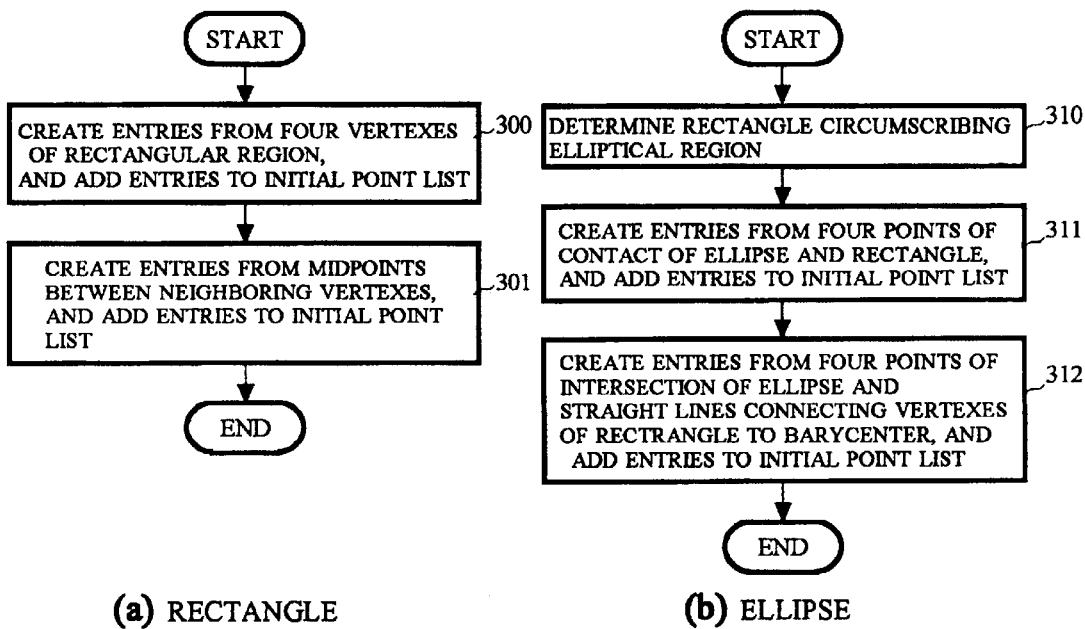
FIG. 3 illustrates flowcharts showing methods for determining initial points when an initial region is a rectangle and an ellipse, respectively.

The present invention is intended to position a plurality of trackers along a contour of a desired object in the image displayed on the screen of the display device 38 in order to extract the desired object. FIG. 2 shows a schematic flow of the present invention. In first step 200, a rough initial region is first established which contains therein the object to be extracted from the image displayed on the screen of the display device 38, and a predetermined number of initial points (e.g., eight initial points) are positioned on a boundary of the initial region. Although a rectangle or an ellipse is used as the initial region in this embodiment, the present invention is, of course, not limited to thereto. In the case of a rectangular initial region, it may be established by pressing a mouse button at a desired point in the image (e.g., a position corresponding to an upper left angle of the rectangle which the user wants to establish), diagonally dragging while pressing and holding the mouse button, and releasing the mouse button at a second desired point (a position corresponding to a lower right angle of the rectangle). An elliptical initial region can be established by a similar operation. Commercially available image processing software is provided with drawing functions for such rectangles and ellipses which the user may use. Although the established initial region must contain therein the object which the user wants to extract, a shape of the initial region can be independent of the contour of the object. Therefore, the user does not have to carefully trace the contour of the object. The initial points on the boundary of the initial region are determined as shown in FIG. 3. This will be described later.

Figure 4:
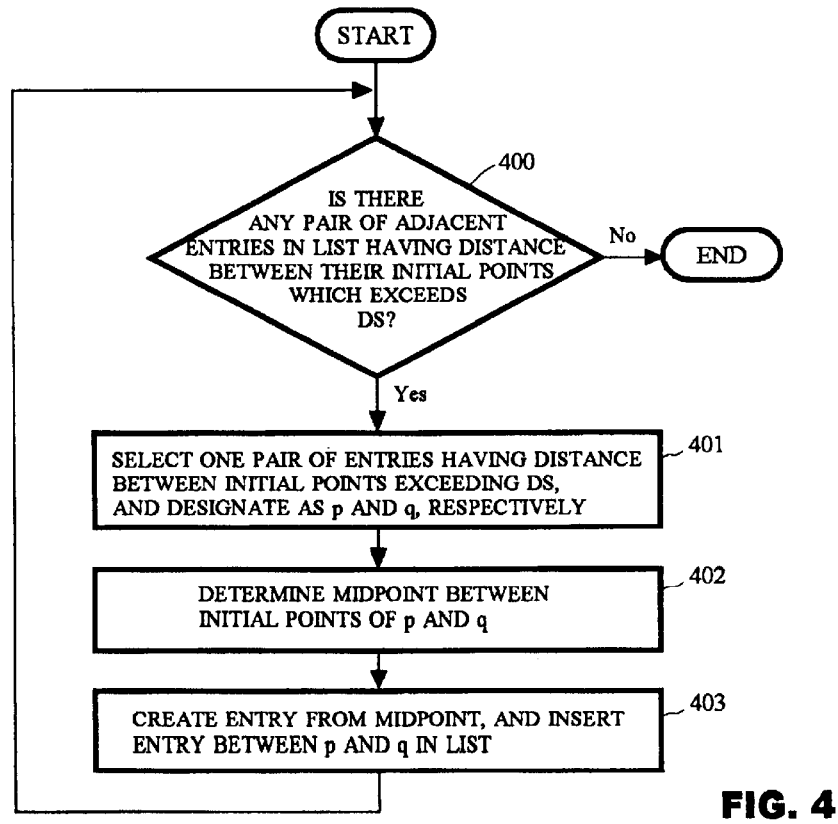
FIG. 4 illustrates a flowchart showing a method for adding new initial points so that a distance between adjacent initial points is equal to or less than a predetermined threshold value.
Figure 5:
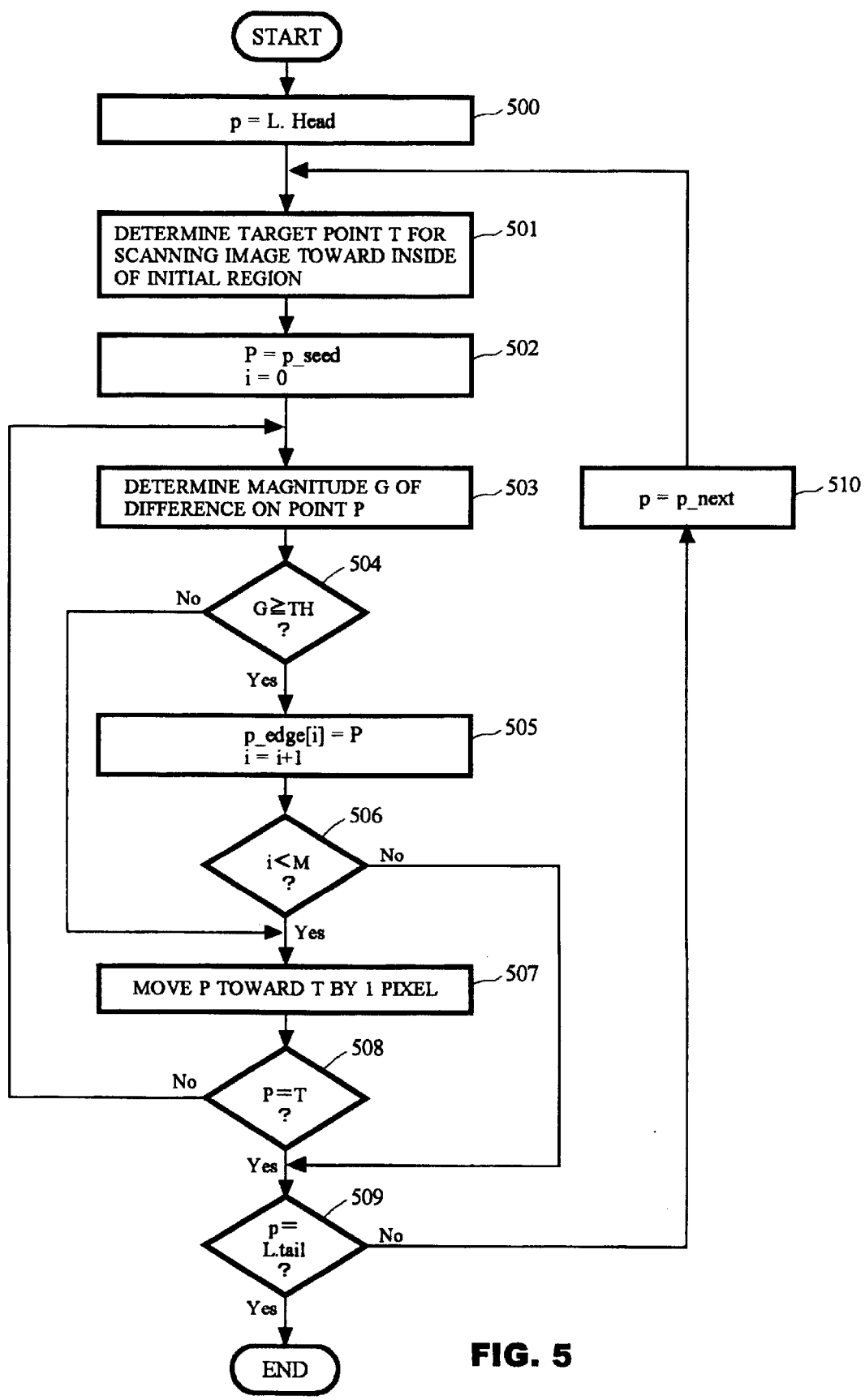
FIG. 5 illustrates a flowchart showing a method for determining tracker candidate points by scanning an inside of the initial region for each initial point.

After a predetermined number of initial points are determined, in step 201, new initial points are added on the boundary of the initial region so that a distance between two adjacent initial points is equal to or less than a predetermined threshold value DS. This takes place in order to obtain more appropriate values in a cost calculation described later. The new initial points are determined as shown in FIG. 4 (described in detail later). After all the necessary initial points are determined, in step 202, tracker candidate points are determined by scanning the inside of the initial region for each initial point. The candidate points are determined as shown in FIG. 5 (described in detail later). After all the tracker candidate points are determined, in step 203, a set of candidate points is selected which best represents the contour of the object which the user wants to extract. This selection can be accomplished by determining a set of candidate points which minimizes a cost, by using dynamic programming. This will be described later with reference to FIG. 9. Finally, in step 204, the candidate points are eliminated at intervals from the selected set of candidate points so that the distance between the trackers is nearly equal to DT, whereby the trackers are determined. This will be described later with reference to FIG. 12.

As described above, according to the present invention, the user can obtain trackers for extracting an object which the user wants to extract only by establishing a rough initial region around the object without tracing the contour of the object. After that, the user can extract the object by connecting the trackers along the contour by means of well-known approaches such as intelligent scissors. The intelligent scissors are described in Eric Mortensen et al., "Intelligent Scissors for Image Composition", COMPUTER GRAPHICS Proceedings, Annual Conference Series, 1995, pp. 191–198, for example. Next, the details of each step of FIG. 2 will be described.

First, a determination of the initial points (step 200) is executed in accordance with a flow of FIG. 3. In FIG. 3, (a) and (b) show the cases where the initial region is a rectangle and an ellipse, respectively. For the rectangular initial region, in step 300, entries are created from coordinates of four vertexes of the rectangular region, and the entries are added to an initial point list. For example, the entries are created in the initial point list in a clockwise order, starting from the vertex of the upper left angle of the rectangular region, then the vertex of the upper right angle thereof, then the vertex of the lower right angle thereof, and finally the vertex of the lower left angle thereof. Then, in step 301, entries are created from the coordinates of midpoints, each between two neighboring vertexes (four midpoints in total), and each of them is inserted between two associated vertex entries in the initial point list. In this example, the entries for eight initial points in total are created and added to the list.

For the elliptical initial region, in step 310, a rectangle circumscribing the elliptical region is determined (this rectangle may be the one established for drawing the ellipse). Then, in step 311, entries are created from the coordinates of points of contact (four points of contact in total) of the ellipse and the rectangle, and added to the initial point list. The four points of contact match both ends of a long diameter of the ellipse and both ends of a short diameter thereof. For instance, one of the points of contact is taken as a head entry, and the entries are added to the list in the clockwise order. Finally, in step 312, entries are created from the coordinates of points of intersection (four points of intersection in total) of the ellipse and straight lines connecting four vertexes of the circumscribing rectangle to a barycenter of the circumscribing rectangle, and added to corresponding positions in the list.

The rectangle and the ellipse have the same contents of each entry created in accordance with the flow of FIG. 3. The contents are as follows.

Entry p:
    p_seed—Initial point
    p_edge[i]—Array of tracker candidate points (i=0, 1, ... p_m−1)
        p_m—Number of tracker candidate points
    p_next—Pointer to a next entry
    p_prev—Pointer to a previous entry
    p_cost[i]—Cumulative cost for each candidate point (cost map)
    p_from[i]—Dependence for each candidate point (index of a candidate point in the previous entry)

As is apparent from the above description, each entry has pointers to the previous and next entries. Therefore, the list comprising such entries is a so-called linked list. In the flow of FIG. 3, p_seed, p_next and p_prev of the above contents are set. The remaining contents are set in the operation described below.

Step 201 of FIG. 2 is executed in accordance with the flow of FIG. 4. In FIG. 4, in first step 400, a check is made for pairs of two adjacent entries in the initial point list created in accordance with the flow of FIG. 3 to see whether there is an entry pair having a distance between their initial points which exceeds a threshold value DS. If there is, the processing goes to step 401 in which such an entry pair is selected and these entries are designated as p and q. In next step 402, a midpoint between the initial points of the entries p and q is calculated. Then, in step 403, an entry is created from the coordinates of the midpoint, and the entry is inserted between the entries p and q in the initial point list. Thereafter, the processing returns to step 400. The flow of FIG. 4 is repeated until there remains no pair of entries having a distance between their initial points exceeding DS. The distance between the initial points is set equal to or less than DS, because a pair of candidate points having longer distance therebetween cannot be successfully evaluated in a cost evaluation of the tracker candidate points. For example, the cost evaluation discussed later is accomplished by evaluating the cost between two candidate points in accordance with colors of their nearby points. This evaluation is based on the assumption that the nearby points have similar colors. Accordingly, this evaluation is useless unless the candidate points are close to each other to some extent. Step 202 in FIG. 2 which determines the tracker candidate points for each initial point thus determined is executed in accordance with the flow of FIG. 5.

Figure 6:
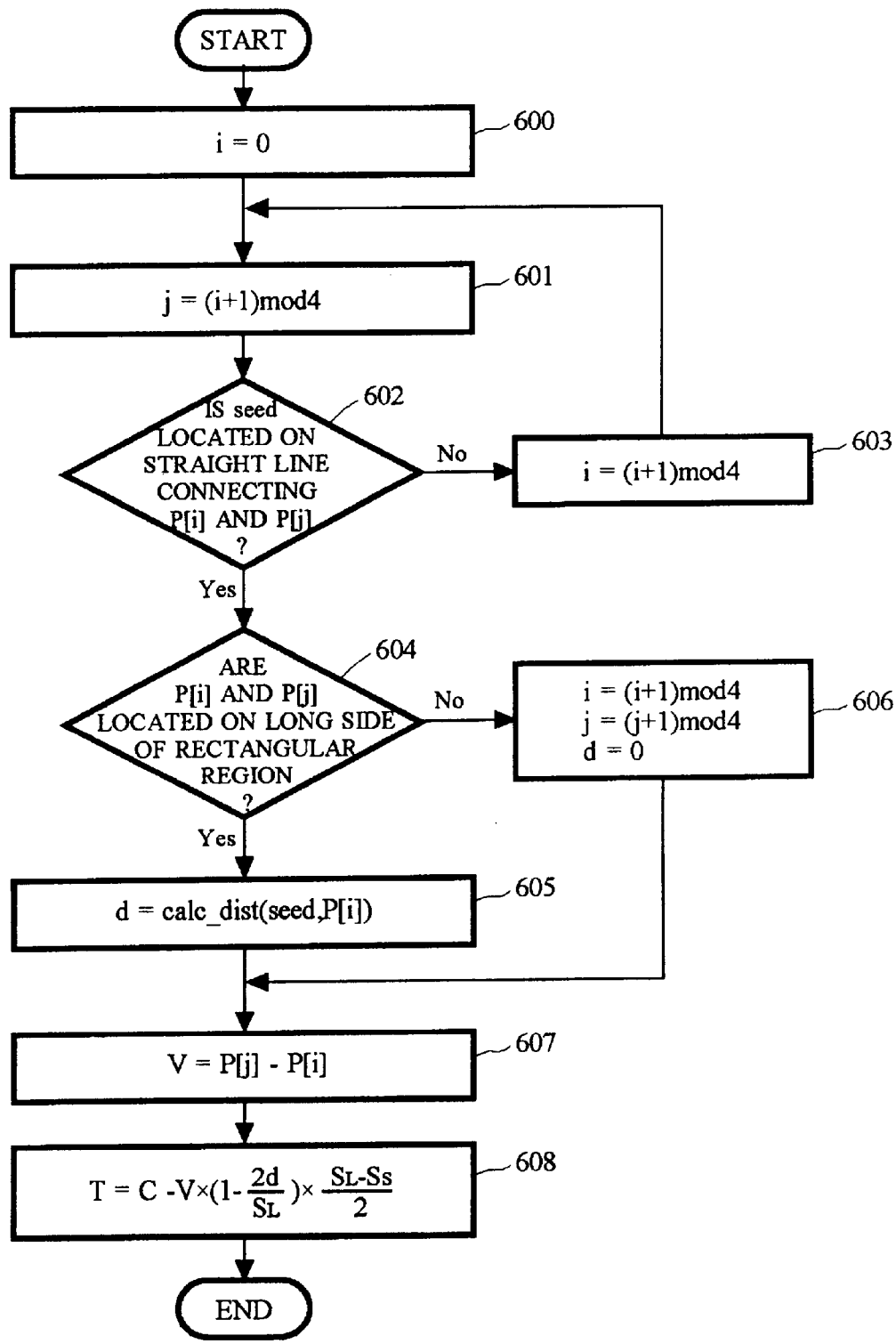
FIG. 6 illustrates a flowchart showing a method for determining a target point for scanning from a selected initial point toward the inside of the initial region.

In FIG. 5, in first step 500, the entry p in the initial point list is set as a head entry L. head. In next step 501, a target point T for scanning the image toward the inside of the initial region is determined. For the elliptical initial region, the barycenter of the ellipse can be used as the target point T. For the rectangular initial region, the target point T is calculated as shown in FIG. 6. This will be discussed later. After the target point T is determined, the processing goes to step 502 in which a point P to be scanned is set at the initial point p_seed of the entry p, and a variable i indicating the numbers of the tracker candidate points is set to 0. Then, in step 503, a magnitude G of a difference on the point P is determined (described in detail below). In step 504, the magnitude G is compared to a predetermined threshold value TH. If the magnitude G is equal to or greater than TH, there is a high possibility that the point P is a contour point. Thus, the processing goes to step 505 in which the point P is set at the tracker candidate point p_edge[i], and i is incremented by 1. Subsequently, in step 506, the check is made to see whether or not i is less than a predefined maximum number M of the tracker candidate points. If i is less than M, the processing goes to step 507 in which the point P is moved by 1 pixel toward the target point T. If i is equal to or greater than M, the processing jumps to step 509. Step 507 is executed also when the magnitude G is less than TH in step 504. In next step 508, whether or not the new point P matches the target point T is checked. If the point P does not match the target point T, the processing returns to step 503 and the detection of the candidate points is repeated. If the point P matches the target point T, the processing goes to step 509 in which the check is made to see whether or not the current entry p is a tail entry L. tail in the list. If the entry p is not the tail entry, the processing goes to step 510 in which a next entry is accessed by using p_next in the current entry p, and then the processing returns to step 501. If the current entry is the tail entry in the list, the processing ends.

In step 506, the number of the tracker candidate points is limited to the maximum number M in order to speed up the calculation. If it is not necessary to take this speedup into consideration, step 506 may be omitted.

Next, how to determine the target point T in the rectangular region will be described with reference to FIG. 6. Here, four vertexes of the rectangular region are designated as P[0] to P[3], respectively, and i and j are used as the variables indicating their numbers. In first step 600, i is initialized to 0. In next step 601, j is set to i+1 in modulo 4 (mod4). Then, in step 602, whether or not seed is located on the straight line connecting P[i] and P[j] is checked in order to determine which side of four sides of the rectangle the initial point seed of the entry (a symbol of the entry is omitted for the sake of simplicity), in which the user wants to set the target point T, is located on. If the initial point seed is not located on the straight line, the processing goes to step 603 in which i is incremented by 1 (mod4). Then, the processing returns to step 601. If the initial point seed is located on the straight line connecting the vertexes P[i] and P[j], the processing goes to step 604 in which whether or not the straight line is a long side of the rectangular region is checked. If the straight line is the long side, the processing goes to step 605 in which a distance d between the initial point seed and the vertex P[i] is calculated by a function calc_dist for calculating an Euclidean distance between two points. If the straight line is a short side, the processing moves from step 604 to step 606 in which i and j are incremented by 1 (mod4) and the distance d is set to 0. After step 605 or 606 ends, the processing goes to step 607 in which a vector V directed from the vertex P[i] toward the vertex P[j] is calculated. Finally, in step 608, the target point T is determined by the following equation:

$$T = C - V\varsigma(1-2d/SL)\varsigma(SL-SS)/2$$

where C represents the barycenter of the rectangular region, SL represents a length of the long side and SS represents a length of the short side.

Figure 7:
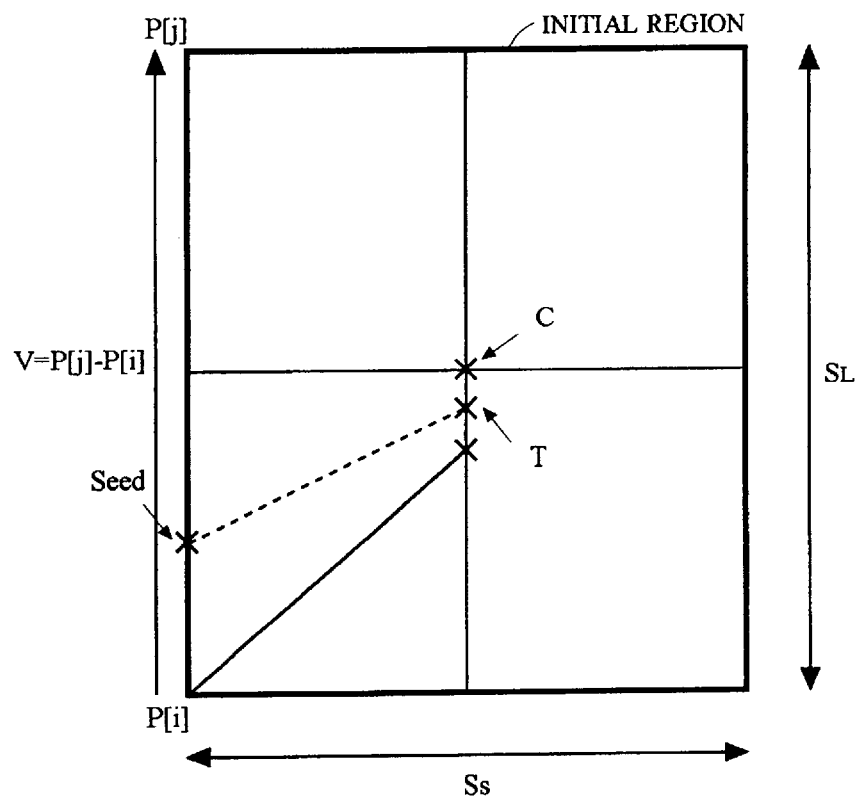
FIG. 7 illustrates a concept of determination of the target point in accordance with a flow of FIG. 6.

FIG. 7 shows a relationship among the vertexes P[i] and P[j], the initial point seed, the target point T, the barycenter C and the vector V. The target point T in the rectangular region is not matched to the barycenter C in order to prevent a nonuniform distribution of the candidate points in a very narrow and long rectangular region.

Figure 8:
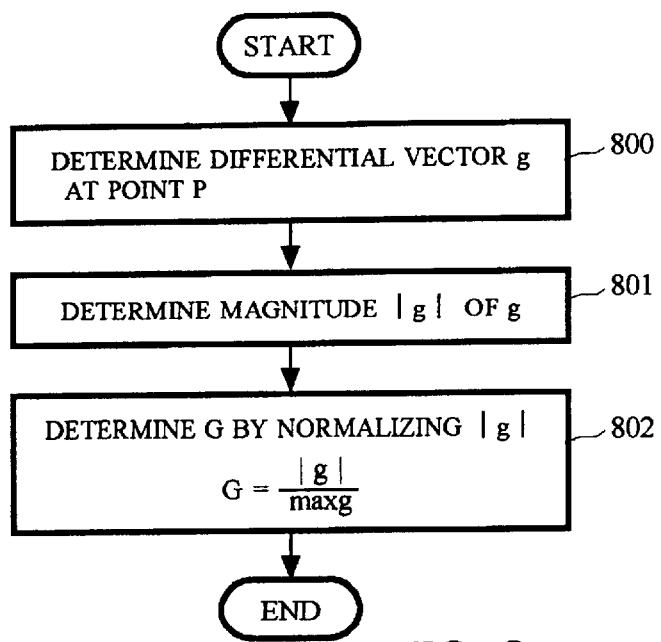
FIG. 8 illustrates a flowchart showing a method for calculating a magnitude of a difference at a selected point to determine the tracker candidate points.

Step 503 for determining the magnitude G of the difference is executed in accordance with the flow of FIG. 8. First, in step 800, a differential vector g at the point P is calculated. This can be accomplished by using a known differential edge detection operator such as Sobel filter. Since such an operator is well known, the detailed description is omitted. Then, in step 801, a magnitude |g| of the differential vector g is determined. Finally, in step 802, the magnitude G is determined by normalizing |g|. That is, the following is calculated:

$$G = |g|/maxg$$

where maxg represents a maximum value which |g| can take on. Accordingly, G ranges from 0 to 1.

Figure 9:
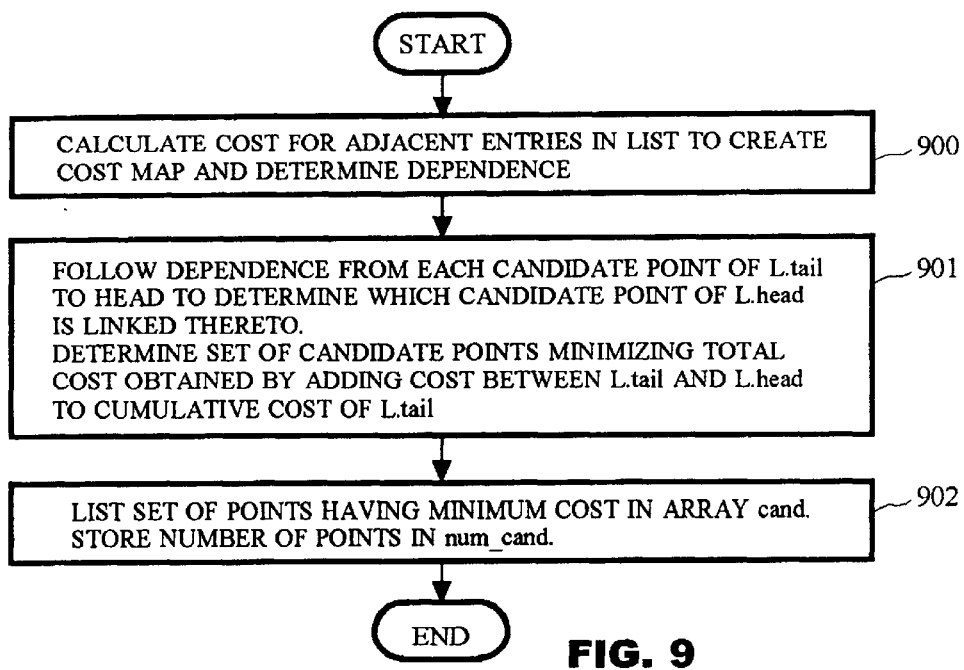
FIG. 9 illustrates a flowchart showing a method for selecting a set of tracker candidate points which is most closely located along a contour of an object, among sets of tracker candidate points.

Next, the flow of FIG. 9 for executing step 203 of FIG. 2 will be described. In first step 900, the cost of adjacent entries in the initial point list created by steps 200 and 201 in FIG. 2 is calculated, whereby the cost map is created and the dependence on each candidate point is determined. Then, in step 901, the dependence is followed from each candidate point of the tail entry L. tail in the list to the head to determine which candidate point of the head entry L. head is linked thereto and determine a set of candidate points which minimizes a total cost obtained by adding the cost between the tail entry and the head entry to the cumulative cost of the tail entry L. tail. Finally, in step 902, the candidate points constituting the set of candidate points having the minimum cost are listed in an array cand. The number of the candidate points is represented as num_cand.

Figure 10:
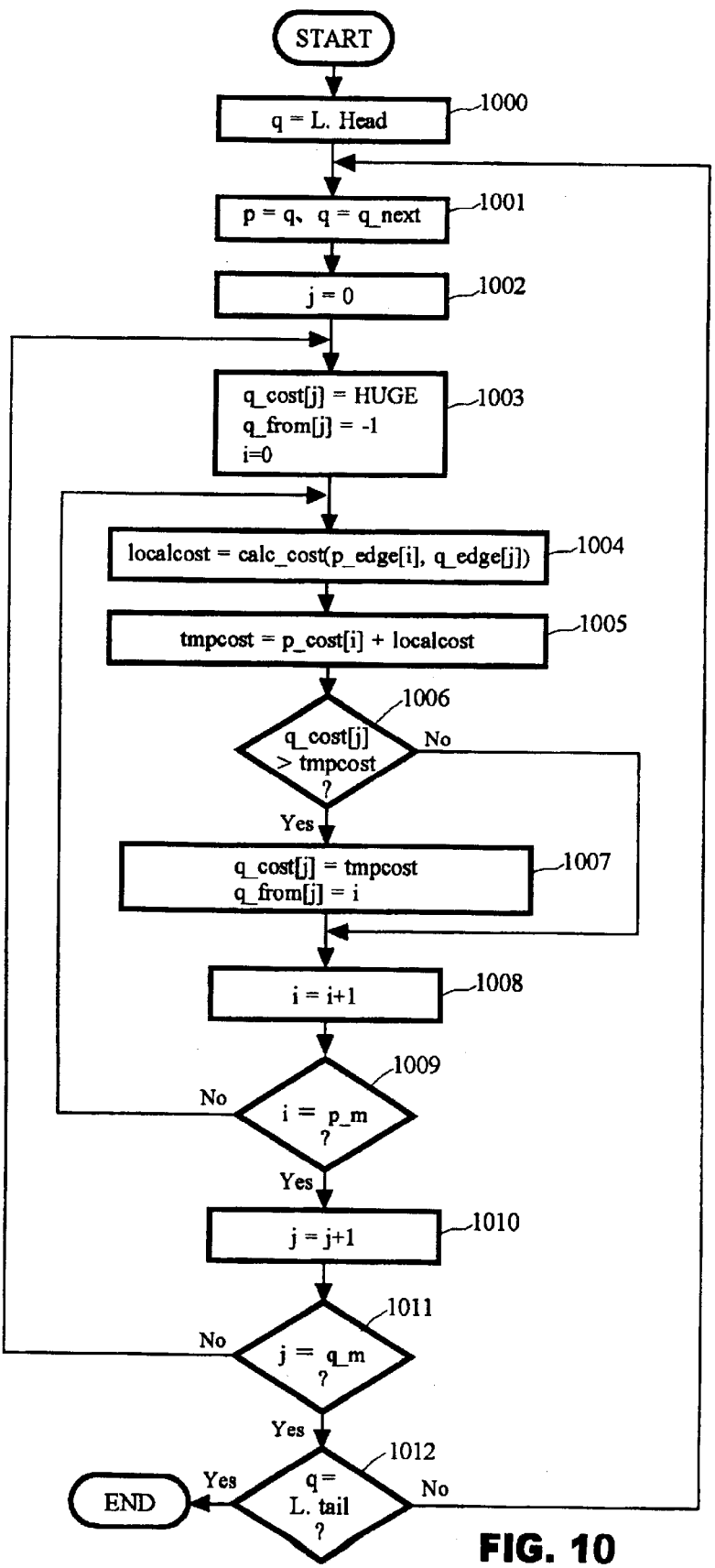
FIG. 10 illustrates a flowchart showing a method for calculating a cost for adjacent entries in an initial point list to create a cost map and determine dependence.

The creation of the cost map and the determination of the dependence in step 900 are executed as shown in FIG. 10. The variables i and j used in FIG. 10 represent the numbers of the candidate points associated with each entry in the initial point list. First, in step 1000, the entry q is set to the head entry L. head in the initial point list. Then, in step 1001, the entry p is set to the entry q, and an entry pointed to by a next entry pointer q_next in the entry q is set as a new entry q. Furthermore, in step 1002, j is initialized to 0. In step 1003, a cumulative cost q_cost[j] of the entry q is set to a predefined huge number HUGE, dependence q_from[j] for each candidate point is set to −1, and i is set to 0. HUGE can be set, for example, by setting all bits of q_cost[j] to 1 when q_cost[j] is an unsigned integer. The dependence q_from[j] is set to −1 in order to indicate that at first it depends on nothing. If this can be indicated anyway, the dependence q_from[j] does not have to be −1. After step 1003 ends, the processing enters the calculation of the cost.

First, in step 1004, a local cost localcost is calculated by using a cost evaluation function calc_cost having, as parameters, the candidate point p_edge[i] of the entry p and the candidate point q_edge[j] of the entry q. In this embodiment, the local cost is calculated according to four different properties, i.e. e magnitude of difference, colors of nearby points, distance from initial point, and positional relationship between candidate points. For the sake of simplicity, designating the respective candidate points by x and y, the function calc_cost (x, y) is defined by the following equation.

$$\text{calc\_cost}(x, y) = (f\_edge(y)(W\_EDGE) + f\_color(x, y)(W\_COLOR) + f\_balloon(y)(W\_BALLOON) + f\_similar(x, y)(W\_SIMILAR))(f)$$

In the above equation, W_EDGE, W_COLOR, W_BALLOON and W_SIMILAR represent weights to the four properties described above and are determined in accordance with an empirical rule so that a good cost evaluation result is obtained. When the distance between the candidate points x and y calculated by the function calc_dist (x, y) is equal to or less than the threshold value DT, the last f is set to 1. When the distance is more than DT, the last f is set to a value greater than 1, e.g., 5 to 10 in order to increase the cost, i.e., in order to prevent the selection of the candidate points x and y. The reason is as follows. It is desirable that the distance between the trackers finally determined is equal to or less than DT.

f_edge(y) represents a cost which is calculated from the magnitude G of the difference at the candidate point y by the following equation.

$$f\_edge = 1 - G$$

The magnitude G ranges from 0 to 1 as described in FIG. 8, and thus f_edge also ranges from 0 to 1.

f_color(x, y) represents a distance between colors of points near the candidate points x and y. The nearby points are not the points immediately adjoining the candidate points but the points located inside relative to the candidate points by a few pixels (e.g., 2 or 3 pixels). Assuming that the color of the point near the candidate point x is indicated by Cx and the color of the point near the candidate point y is indicated by Cy, f_color(x, y) is calculated by the following equation.

$$f\_color(x, y)=(abs(\text{red component of Cx}-\text{red component of Cy})+\\ abs(\text{green component of Cx}-\text{green component of Cy})+abs(\text{blue}\\ \text{component of Cx}-\text{blue component of Cy}))(\tfrac{1}{3})$$

f_balloon(y) is obtained by normalizing a distance from the initial point. f_balloon(y) is calculated by the following equation:

$$f\_balloon(y)=\text{calc\_dist}(S, y)/\text{calc\_dist}(S, T)$$

where S denotes the initial point of the entry including the candidate point y, and T denotes the target point to be scanned from the initial point S. The function calc_dist calculates an Euclidean distance between two points as described above.

f_similar(x, y) represents a cost which is calculated from the positional relationship of the candidate points x and y. f_similar(x, y) is expressed as the following equation:

$$f\_similar(x, y)=abs(\text{calc\_dist}(x, Tx)/\text{calc\_dist}(Sx, Tx)-\text{calc\_dist}(y, Ty)/\text{calc\_dist}(Sy, Ty))$$

where Sx denotes the initial point of the entry including the candidate point x, Sy denotes the initial point of the entry including the candidate point y, and Tx and Ty denote the target points of the respective entries.

After the calculation of the local cost ends, in step 1005, a temporary cost tmpcost is calculated by adding the local cost to the cumulative cost p_cost[i] in the entry p. Then, in step 1006, whether or not the temporary cost is less than the cumulative cost q_cost[j] in the entry q is checked. If the temporary cost is less than the cumulative cost, the processing goes to step 1007. Otherwise, the processing jumps to step 1008. In step 1007, the value of the temporary cost is set to the cumulative cost q_cost[j] in the entry q, and the value q_from[j] indicating the dependence is set to i. In step 1008, i is incremented by 1. In step 1009, whether or not i reaches the number p_m of the tracker candidate points in the entry p is checked. If i is equal to p_m, the processing goes to step 1010 and j is incremented by 1. Otherwise, the processing returns to step 1004. In step 1011, the check is made to see whether or not j incremented reaches the number q_m of the tracker candidate points in the entry q. If j is equal to q_m, the processing goes to step 1012. Otherwise, the processing returns to step 1003. In step 1012, whether or not the entry q is the tail entry L. tail in the list is checked. If the entry q is not the tail entry, the processing returns to step 1001. If the entry q is the tail entry, the processing ends. In this manner, the flow of FIG. 10 calculates the cumulative cost by moving from a given initial point to its adjacent initial point along the boundary of the initial region.

Figure 11:
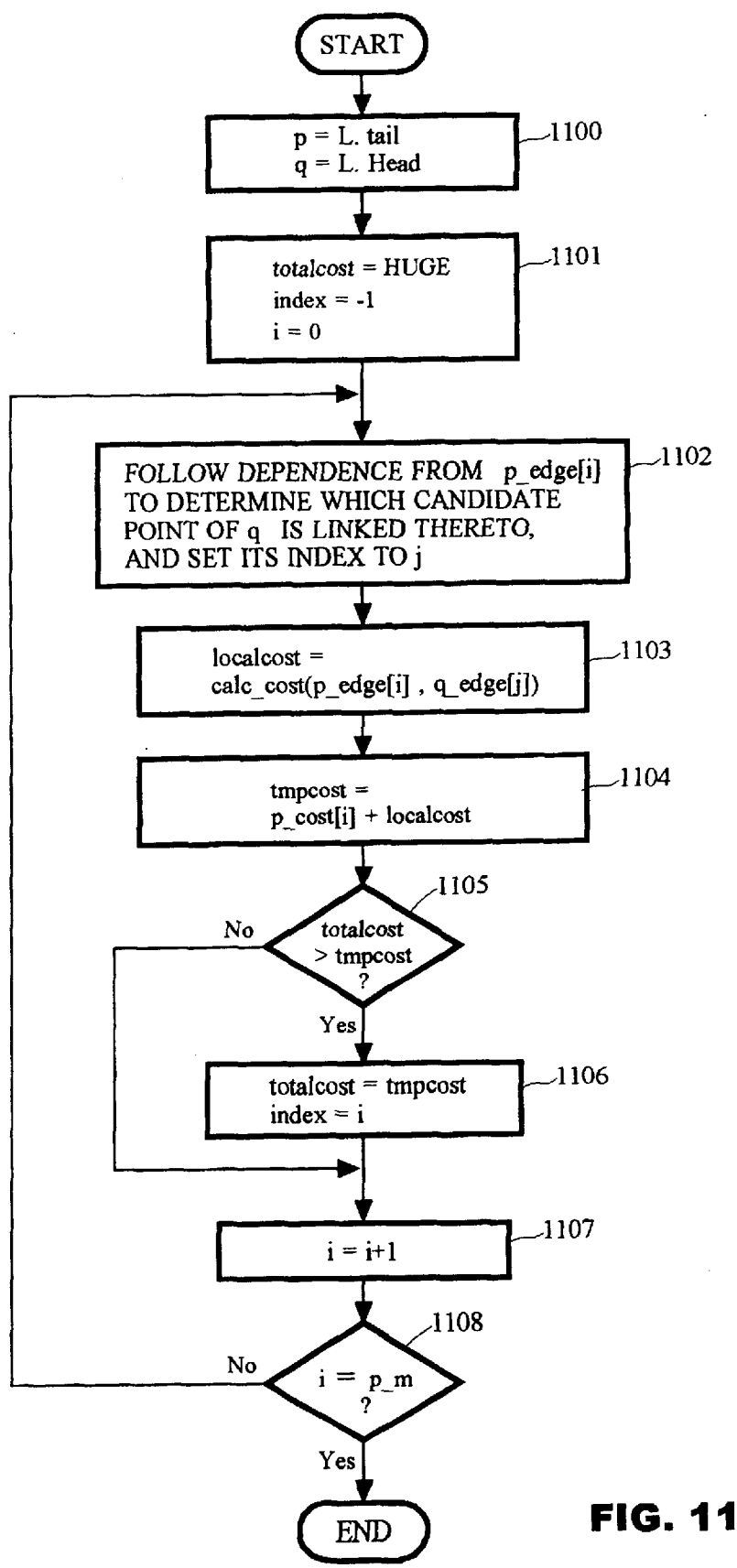
FIG. 11 illustrates a flowchart showing a method for following forward the dependence from each candidate point of a tail entry to determine which candidate point of a head entry is linked thereto, and determining a set of candidate points which minimizes a total cost obtained by adding the cost between the tail entry and the head entry to a cumulative cost of the tail entry.

Next, the details of step 901 in FIG. 9 will be described with reference to FIG. 11. First, in step 1100, the tail entry L. tail in the initial point list is set to p, and the head entry L. head is set to q. In next step 1101, a total cost totalcost is set to the huge number HUGE (in the same manner as step 1003 in FIG. 10), index is set to −1, and i is set to 0. In step 1102, the dependence determined by the flow of FIG. 10 is followed from the candidate point p_edge[i] of the entry p to determine which candidate point of the entry q is linked thereto, and the index of the determined candidate point is set to j. At this time, it is seen that the candidate point p_edge[i] of the entry p is linked to the candidate point q_qedge[j] of the entry q. In subsequent steps 1103 and 1104, the local cost localcost and the temporary cost tmpcost are calculated in the same way as steps 1004 and 1005 in FIG. 10, respectively. In step 1105, whether or not the temporary cost is less than the total cost is checked. If the temporary cost is less than the total cost, the processing goes to step 1106. Otherwise, the processing jumps to step 1107. In step 1106, a new value of the total cost is set to the value of the temporary cost, and the index is set to i. After i is incremented by 1 in step 1107, the check is made in step 1108 to see whether or not i incremented reaches the number p_m of the candidate points of the entry p. If i is less than p_m, the processing returns to step 1102. Otherwise, the processing ends. In this manner, the flow of FIG. 11 determines which set of candidate points is appropriate in consideration of the cost between the last initial point and the first initial point.

Figure 12:
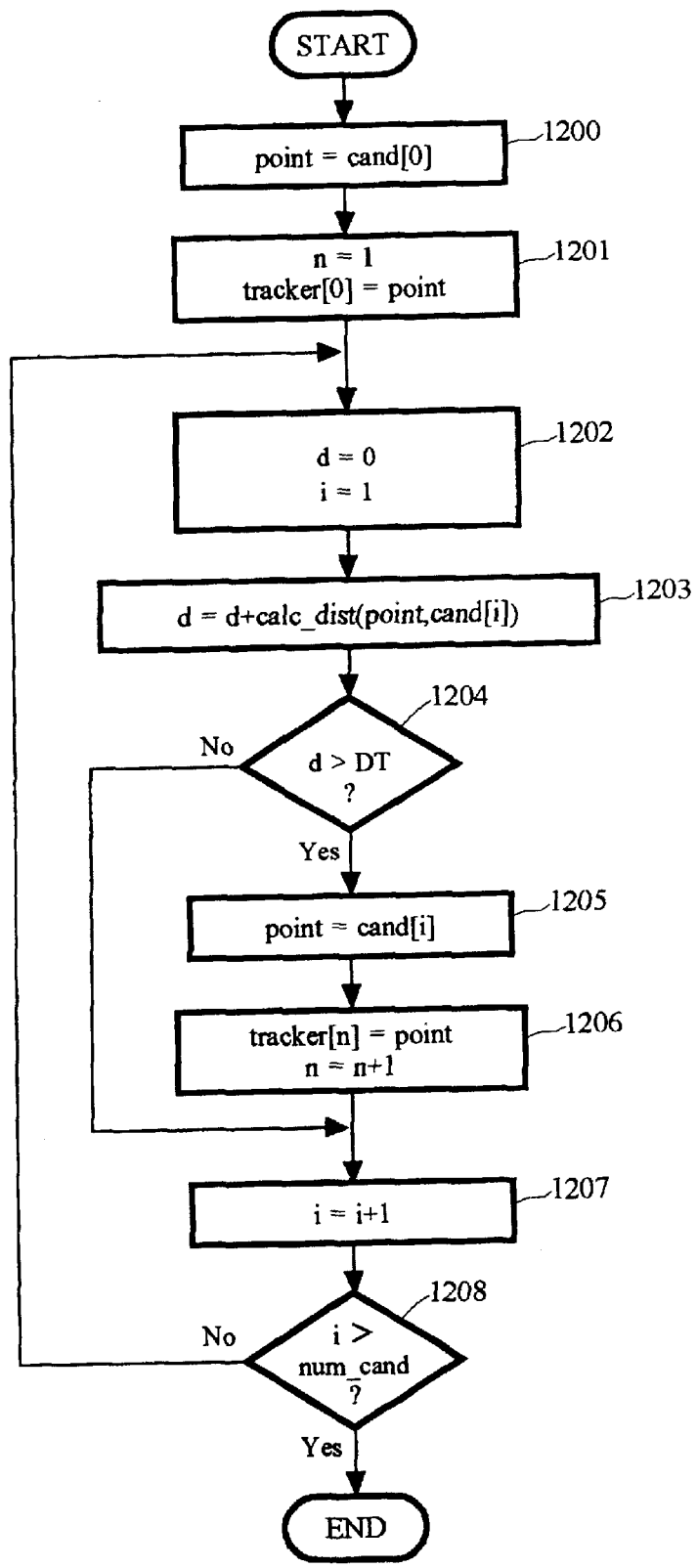
FIG. 12 illustrates a flowchart showing a method for eliminating at intervals the tracker candidate points from a set of selected tracker candidate points.

Next, the details of step 204 in FIG. 2 will be described with reference to FIG. 12. First, in step 1200, a parameter point is set to the first candidate point cand[0] of the array storing a set of selected candidate points. In next step 1201, a variable n is initialized to 1, and the first tracker tracker[0] is set to point. In step 1202, the distance d between the candidate points is initialized to 0, and the variable i is initialized to 1. In next step 1203, the distance d is calculated by using the function calc_dist. The function calc_dist gives the distance between two candidate points in question (at first, cand[0] and cand[1]). Then, in step 1204, it is checked whether or not d calculated is greater than a predetermined tracker interval DT. If d is greater than DT, the processing goes to step 1205. Otherwise, the processing jumps to step 1207. In step 1205, point is set to the i-th candidate point cand[i]. In step 1206, the n-th tracker tracker[n] is set to point and n is incremented by 1. After i is incremented by 1 in step 1207, i is compared to the number of the candidate points num_cand stored in the array cand in step 1208. If i is less than num_cand, the processing returns to step 1202. Otherwise, the processing ends.

The trackers thus determined are positioned nearly on the contour of the object which the user wants to extract. After the trackers are determined, the user has only to connect the trackers along the contour by means of the well-known approaches such as the intelligent scissors, as described above. If a certain tracker is not located on a desired position, the user can move the tracker to the desired position by dragging with a mouse. In this case, when the user selects with the mouse the tracker which the user wants to move, the color of the tracker and the contour line portion connected thereto may be changed from those of the other portions. This facilitates the positioning of the contour.

While the invention has been particularly shown and described with respect to preferred embodiments thereof, it will be understood by those skilled in the art that the foregoing and other changes in form and details may be made therein without departing form the spirit and scope of the invention.

What is claimed is:

1. A method for automatically determining trackers along a contour of a particular object in a displayed image, comprising the steps of:
    establishing an initial region containing said particular object therein and setting a plurality of initial points on a boundary of said initial region;
    forming a list of said initial points;
    setting a target point for scanning the image from each of said plurality of initial points toward the inside of said initial region;
    using said list of initial points, selecting one or more tracker candidate points along a line segment between each of said plurality of initial points and said target point, based on the magnitude of the contour; and determining a set of tracker candidate points which minimizes a cost, by using dynamic programming, starting from a selected initial point among said plurality of initial points;

wherein said step of forming said list includes the step of, for each initial point, adding an entry to the list to form a linked list wherein entries on the list include pointers to other entries on the list.

2. The method according to claim 1, wherein said step of setting said plurality of initial points includes the step of positioning said initial points so that a distance between said initial points is equal to or less than a predetermined threshold value.

3. The method according to claim 1, wherein said step of selecting said tracker candidate points calculates a differential vector at each point between each initial point and the target point and then determines said magnitude from the magnitude of said differential vector.

4. A computer readable storage medium storing a program for implementing a method for automatically determining trackers alone a contour of a particular object in a displayed image, said program comprising:

program code means for establishing an initial region containing said particular object therein and setting a plurality of initial points on a boundary of said initial region;

program code means for forming a list of said initial points;

program code means for setting a target point for scanning the image from each of said plurality of initial points toward the inside of said initial region;

program code means for using said list of initial points, selecting one or more tracker candidate points along a line segment between each of said plurality of initial points and said target point, based on the magnitude of the contour; and program code means for determining a set of tracker candidate points which minimizes a cost, by using dynamic programming, starting from a selected initial point among said plurality of initial points;

wherein said program code means for forming said list includes program code means for adding, for each initial point, an entry to the list to form a linked list wherein entries on the list include pointers to other entries on the list.

5. The storage medium according to claim 4, wherein said program code means for setting said plurality of initial points includes program code means for positioning said initial points so that a distance between said initial points is equal to or less than a predetermined threshold value.

6. The storage medium according to claim 4, further comprising program code means for determining the trackers by eliminating candidate points at intervals from said set of tracker candidate points so that the distance between the trackers exceeds a predetermined threshold value.

7. The storage medium according to claim 6, wherein said initial region is a rectangle, and said program code means for setting said plurality of initial points sets, as said initial points, four vertexes of said rectangle and midpoints between the neighboring vertexes.

8. The storage medium according to claim 6, wherein said initial region is an ellipse, and said program code means for setting said plurality of initial points sets, as said initial points, both ends of long and short diameters of said ellipse and the points of intersection of said ellipse and straight lines connecting four vertexes of the rectangle circumscribing said ellipse to a barycenter of the rectangle.

9. The storage medium according to claim 4, wherein said program code means for selecting said tracker candidate points calculates a differential vector at each point between each initial point and the target point and then determines said magnitude from the magnitude of said differential vector.

10. A method for automatically determining trackers along a contour of a particular object in a displayed image, comprising the steps of:

establishing an initial region containing said particular object therein and setting a plurality of initial points on a boundary of said initial region;

setting a target point for scanning the image from each of said plurality of initial points toward the inside of said initial region;

selecting one or more tracker candidate points along a line segment between each of said plurality of initial points and said target point, based on the magnitude of the contour;

determining a set of tracker candidate points which minimizes a cost, by using dynamic programming, starting from a selected initial point among said plurality of initial points; and determining the trackers by eliminating the candidate points at intervals from said set of tracker candidate points so that the distance between the trackers exceeds a predetermined threshold value.

11. The method according to claim 10, wherein
said initial region is a rectangle, and
said step of setting said plurality of initial points sets, as said initial points, four vertexes of said rectangle and midpoints between the neighboring vertexes.

12. The method according to claim 10, wherein
said initial region is an ellipse, and
said step of setting said plurality of initial points sets, as said initial points, both ends of long and short diameters of said ellipse and the points of intersection of said ellipse and straight lines connecting four vertexes of a rectangle circumscribing said ellipse to a barycenter of the rectangle.

* * * * *